Inventor
Frank A. Richards
By
Kemon, Palmer, Stewart & Estabrook
Attorneys

Inventor
Frank A. Richards
By Kemon, Palmer, Stewart & Estabrook
Attorneys

United States Patent Office 3,450,373
Patented June 17, 1969

3,450,373

PLURAL MODULATION OF RADIO-FREQUENCY CARRIER WAVE FOR REMOTE MISSILE CONTROL SYSTEMS

Frank A. Richards, Luton, England, assignor to British Aircraft Corporation Limited, London, England Filed Aug. 23, 1967, Ser. No. 662,664
Claims priority, application Great Britain, Aug. 25, 1966, 38,271/66
Int. Cl. F41g 7/00
U.S. Cl. 244—3.14 7 Claims

ABSTRACT OF THE DISCLOSURE

An apparatus for generating a missile control signal containing two data signals is disclosed. Such apparatus includes a means to modulate a low-frequency alternating signal with data signals from two channels representing different variables in quadrature phase relationship. The thus modulated signal in turn is used to modulate a radio-frequency carrier wave so that the magnitude of the data signals is represented in the modulated carrier by the phase of the low-frequency modulating signal. The same carrier wave is additionally modulated in accordance with a phase reference signal and with the amplitude of the low-frequency alternating signal modulated by the two data signals in phase quadrature.

Missile control systems are known in which a manually operable flight controller can be used by an operator to transmit to the missile by radio command the pitch and yaw instructions. The most common method of transmitting different items of data is a pulse code modulated system, either using separate carriers for the different items of data or using a single carrier modulated with the different items of data on a time-sharing basis.

The present invention is concerned with the transmission of two different items of data over a single radio channel and with a receiving and control system adapted to respond to an incoming signal in which the two items of data are represented in polar coordinate form.

According to the present invention, the apparatus for generating the missile control signal includes a generator for providing a low-frequency alternating signal, means for modulating the said alternating signal with data signals from two data channels, representing different variables, in quadrature phase relationship, a generator for providing a radio-frequency carrier wave means for modulating the said radio-frequency carrier wave with the said modulated alternating signal so that the relative magnitude of the two data signals is represented in the modulated carrier wave by the phase of the low-frequency modulating signal, and means whereby the radio-frequency carrier wave is additionally modulated in accordance with a phase reference signal and with the amplitude of the said low-frequency alternating signal which is modulated by the two data signals in phase quadrature. In the preferred form of control signal generator, the radio-frequency carrier wave is frequency modulated by the low-frequency modulating signal in accordance with the phase and amplitude of the modulation of the latter and a phase reference signal is represented by amplitude modulation of the radio-frequency carrier wave at a frequency equal to that of the said alternating signal. The amplitude of the low-frequency modulating signal may be transmitted in the form of pulse width modulation of this signal, effected before this signal is used to frequency modulate the radio-frequency carrier wave.

In this way, we convert the pitch and yaw demands in a missile control system to polar coordinates and we transmit them to the missile in this form. In the preferred arrangement, the receiver in the missile and the torque motors for adjusting the control surfaces of the missile are such that there is no need to convert the incoming control signals to DC. The polar coordinates may be preserved in the signal throughout the receiver and may be applied to the control windings of torque motors for the airframe controls. The phase reference is applied to the reference windings of these motors, after modification in accordance with the existing angle of roll of the missile.

In order that the invention may be better understood, one example will now be described with reference to the accompanying drawings, which relate to apparatus for transmitting pitch and yaw instructions to a missile. In the drawings.

Figure 1:
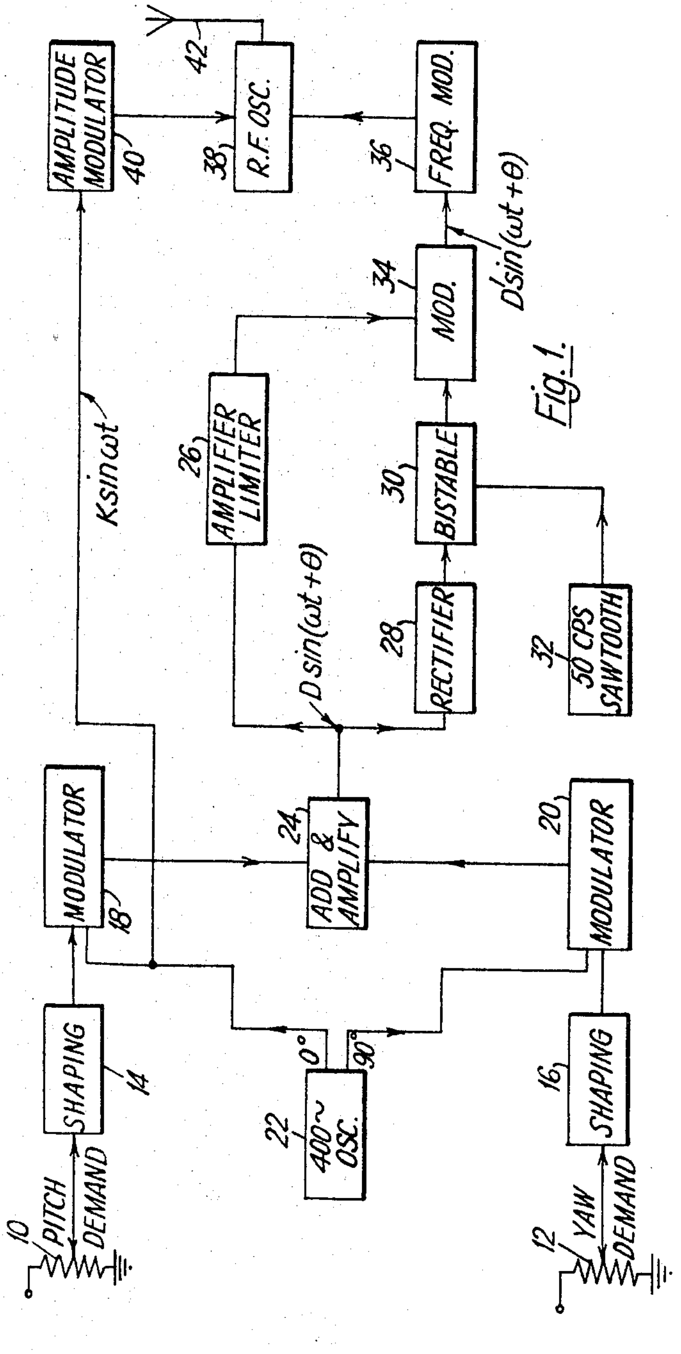
FIGURE 1 shows the ground equipment for generating the control signals.
Figure 2:
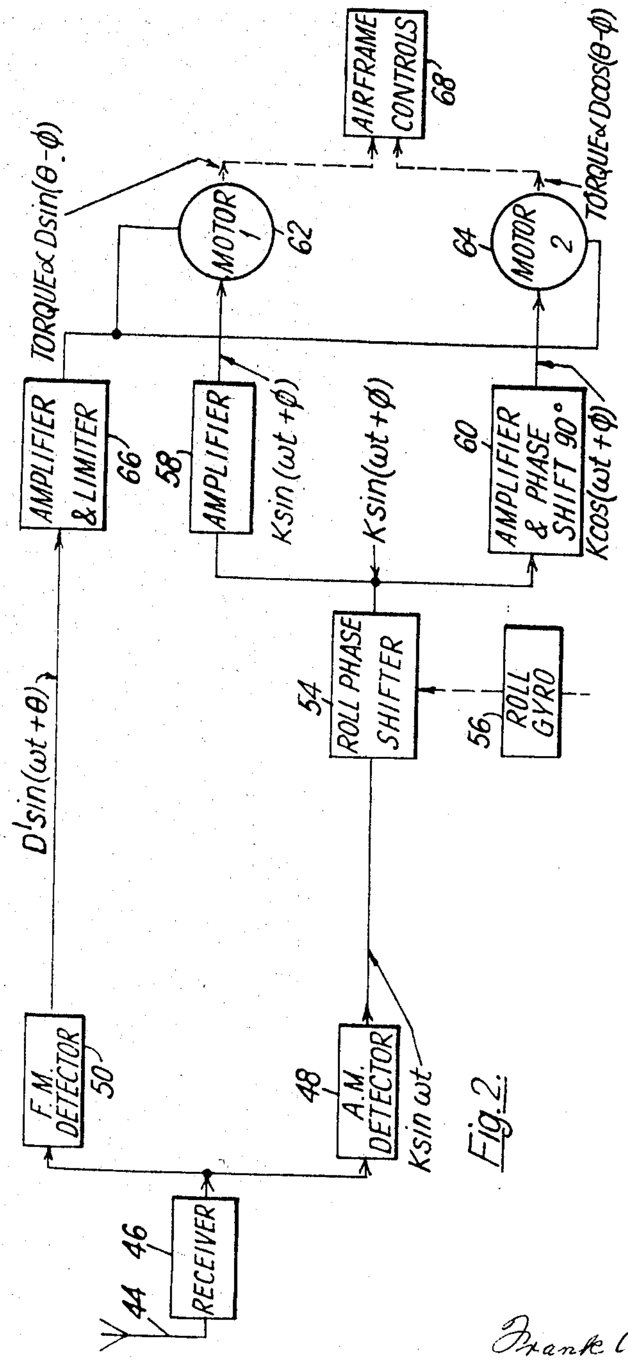
FIGURE 2 shows the equipment in the missile for receiving and decoding the control signal.

At the ground station, the pitch and yaw demand signals are derived from two potentiometers 10 and 12 in a flight controller. These potentiometers may, for example, be adjusted by movement of a thumb button which is free to move anywhere within a predetermined area on the controller. The two voltages are passed through shaping circuits 14 and 16, which include standard phase advance networks and are intended to match the operator performance to the control loop, and are then applied as modulating signals to modulator circuits 18 and 20. These circuits also receive 400 c.p.s. alternating signals from an oscillator 22, but the signal received by the modulator 20 is at 90° phase displacement with respect to that received by the modulator 18. The outputs of these two modulator circuits are added in a summing circuit 24 to produce a waveform represented by the expression D sin $(\omega t+\theta)$. The amplitude of this signal is proportional to the modulus of the shaped demands and its phase angle is proportional to the argument. The output of the summing amplifier 24 is split into two paths, in one of which the waveform is amplitude-limited in a circuit 26 so that the output of the circuit 26 contains only the phase information representative of the relative magnitudes of the pitch and yaw demand signals. In the other path, the output of the summing amplifier 24 is applied to a rectifier 28 and the resultant unidirectional signal goes to a bistable circuit 30 which also receives a sawtooth waveform of 50 c.p.s. from a sawtooth generator 32. As a consequence, the output of the bistable circuit consists of a pulsed signal having a basic repetition frequency of 50 c.p.s. in which the width of the pulses is modulated in accordance with the amplitude of the signal from the summing amplifier 24. This pulse-width coded signal and the amplitude-limited signal from the circuit 26 are together applied to a modulator 34. The output of the modulator 34 is a signal pulse-width modulated at a basic frequency of 50 c.p.s. in accordance with the amplitude of the combined phrase quadrature signals, and in which each pulse consists of a train of cycles at 400 c.p.s., the phase of which corresponds to the phase of the resultant of the combined phase-quadrature signals. In the drawing, this signal is represented by the expression $D'$ sin $(\omega t+\theta)$. This signal, in which the 400 c.p.s. amplitude is constant, is then employed by the circuit 36 to frequency modulate a radio-frequency carrier wave generated by the radio-frequency oscillator 38.

At the same time, a phase reference signal $K$ sin $\omega t$ derived from the oscillator 22 is employed by an amplitude modulating circuit 40 to modulate in amplitude the radio-frequency carrier wave generated by the circuit 38. The resultant amplitude and frequency modulated wave is transmitted from the antenna 42 to the missile. This form of signal occupies a smaller band-width and requires a lower power, for the same degree of rejection of interference, than a conventional pulse-code modulated signal.

In the missile, the signal from the antenna 44 is applied to the receiver input circuits 46 and is then split into two signal paths in which the amplitude and frequency modulation are recovered by detectors 48 and 50 respectively. The output of the amplitude modulation detector 48 is applied to a roll phase shifter 54. The roll phase shifter is driven by the roll gyro 56 and providing an output signal $K \sin(\omega t+\phi)$, where $\phi$ is the angle of the roll gyro and thus of the missile. This signal is split into two parts, one part being applied to an amplifier 58 and the other part being applied to an amplifier 60 with a 90° phase shift. The output from the latter amplifier is thus given by the expression $K \cos(\omega t+\phi)$. The signal from the amplifiers 58 and 60 go to the reference phase of the control circuit torque motors 62 and 64, respectively.

The signals for the control phase windings of these motors are derived from the frequency modulation detector 50 and are first passed through an amplifying and limiting circuit 66. The torque applied by the motor 62 to the airframe controls 68 is proportional to $D \sin(\theta-\phi)$. The torque applied to the airframe controls by the motor 64 is proportional to $D \cos(\theta-\phi)$; in other words, these two-phase induction servo motors produce torque proportional to the average voltage impressed on the control phase by the pulse width modulated 400 c.p.s. signal and also proportional to the sine and cosine respectively of the phase difference between the control and reference voltages.

I claim:

1. Apparatus for generating a missile control signal containing two data signals, comprising: a generator for providing a low-frequency alternating signal; means for modulating the said alternating signal with data signals from two data channels, representing different variables, in quadrature phase relationship; a generator for providing a radio-frequency carrier wave; means for modulating the said radio-frequency carrier wave with the said modulated alternating signal so that the relative magnitude of the two data signals is represented in the modulated carrier wave by the phase of the low-frequency modulating signal; and means whereby the radio-frequency carrier wave is additionally modulated in accordance with a phase reference signal and with the amplitude of the said low-frequency alternating signal modulated by the said two data signals in phase quadrature.

2. Apparatus in accordance with claim 1, in which the radio-frequency carrier wave is amplitude-modulated in accordance with a phase reference signal having the frequency of the said low-frequency alternating signal.

3. Apparatus in accordance with claim 2, in which the carrier is frequency modulated by a signal carrying data representing the phase and amplitude of the said data signals combined in quadrature phase relationship.

4. Apparatus in accordance with claim 3, including means for pulse-width modulating the said low-frequency alternating signal in accordance with the amplitude of the resultant of the two said data signals combined in quadrature phase relationship, the resultant pulse-width modulated and phase modulated low-frequency alternating signal being used to frequency modulate the radio-frequency carrier wave.

5. Apparatus in accordance with claim 1, in which the two data signals represent the required pitch and yaw of the missile.

6. A circuit for receiving a signal generated by apparatus in accordance with claim 3, in which signal the two data signals represent the required pitch and yaw of the missile in which the receiving circuit is installed, the circuit comprising: a pair of alternating current two-phase torque motors for adjusting airframe controls of the missile to control its pitch and yaw, each torque motor having a control winding and a reference winding; a frequency modulation detector circuit for applying to the control windings of the torque motors a signal varying in phase and amplitude with the phase and amplitude of the resultant of the two data signals combined in quadrature phase relationship; and an amplitude modulation detector for applying to the reference winding a phase reference signal represented by the amplitude modulation of the incoming radio-frequency carrier wave.

7. A circuit in accordance with claim 6, including phase shifting means for obtaining a signal in phase quadrature with the phase reference signal obtained from the amplitude modulation detector, and further phase shifting means responsive to the angle of roll of the missile for phase-displacing the reference signal and the said signal in phase quadrature thereto by the said roll angle before applying these two signals to the reference windings of the two torque motors, respectively.

References Cited

UNITED STATES PATENTS

| | | | |
|---|---|---|---|
| 2,889,521 | 6/1959 | Levine et al. | 325—47 X |
| 3,069,679 | 12/1962 | Sweeney et al. | 325—139 X |
| 3,224,710 | 12/1965 | Hermann et al. | 244—3.14 |
| 3,332,641 | 7/1967 | Bezerie | 244—3.12 |

FOREIGN PATENTS

| | | |
|---|---|---|
| 763,029 | 7/1967 | Canada. |

VERLIN R. PENDEGRASS, *Primary Examiner.*

U.S. Cl. X.R.

244—119, 123